July 29, 1941.   B. G. DONLEY ET AL   2,251,013
MACHINE FOR SETTING, SHIFTING, AND REMOVING POLES
Filed March 28, 1938   10 Sheets-Sheet 3

Inventors:
Bartrum G. Donley
Gilbert Genung
By [signature]
Attys

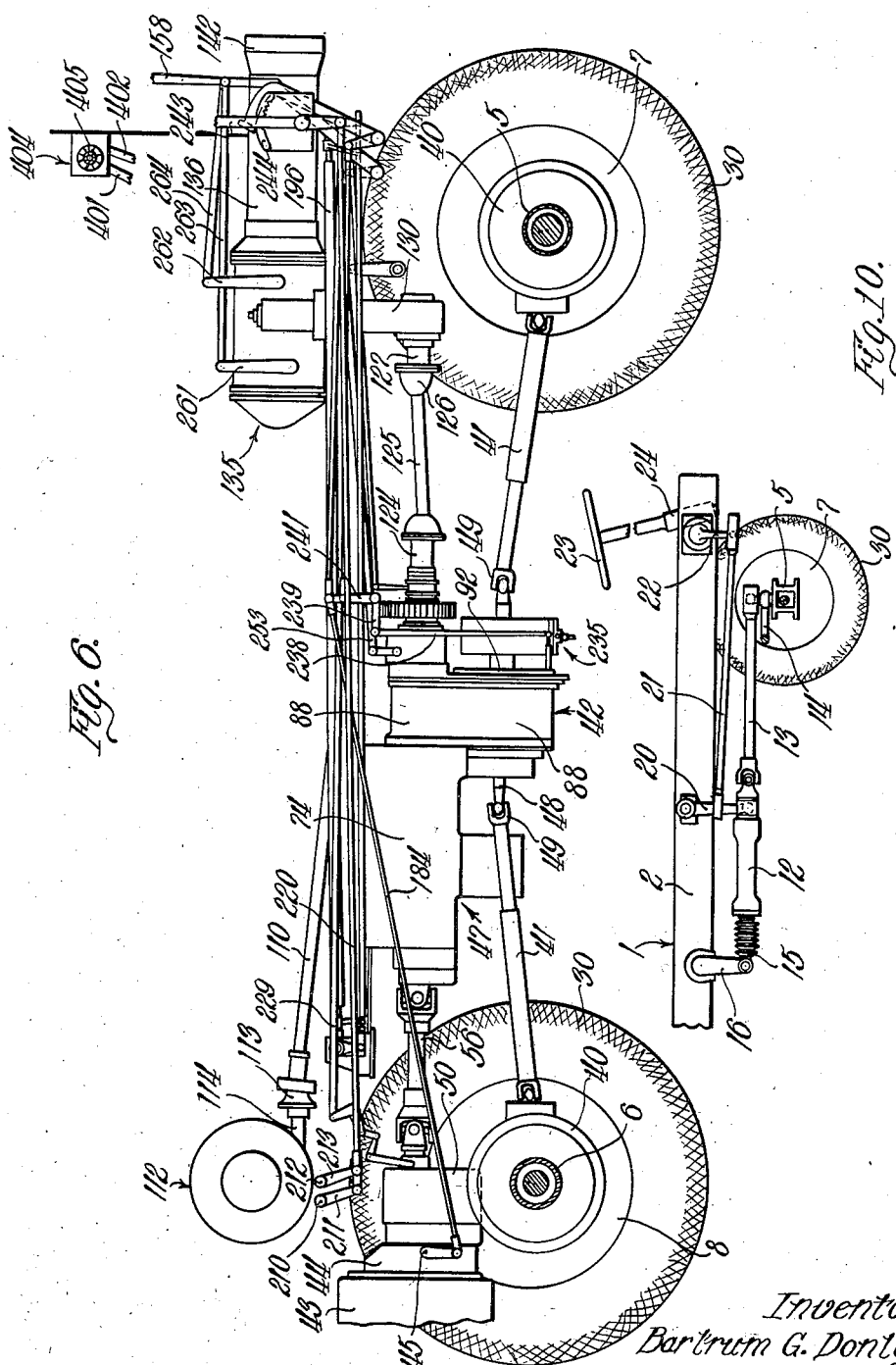

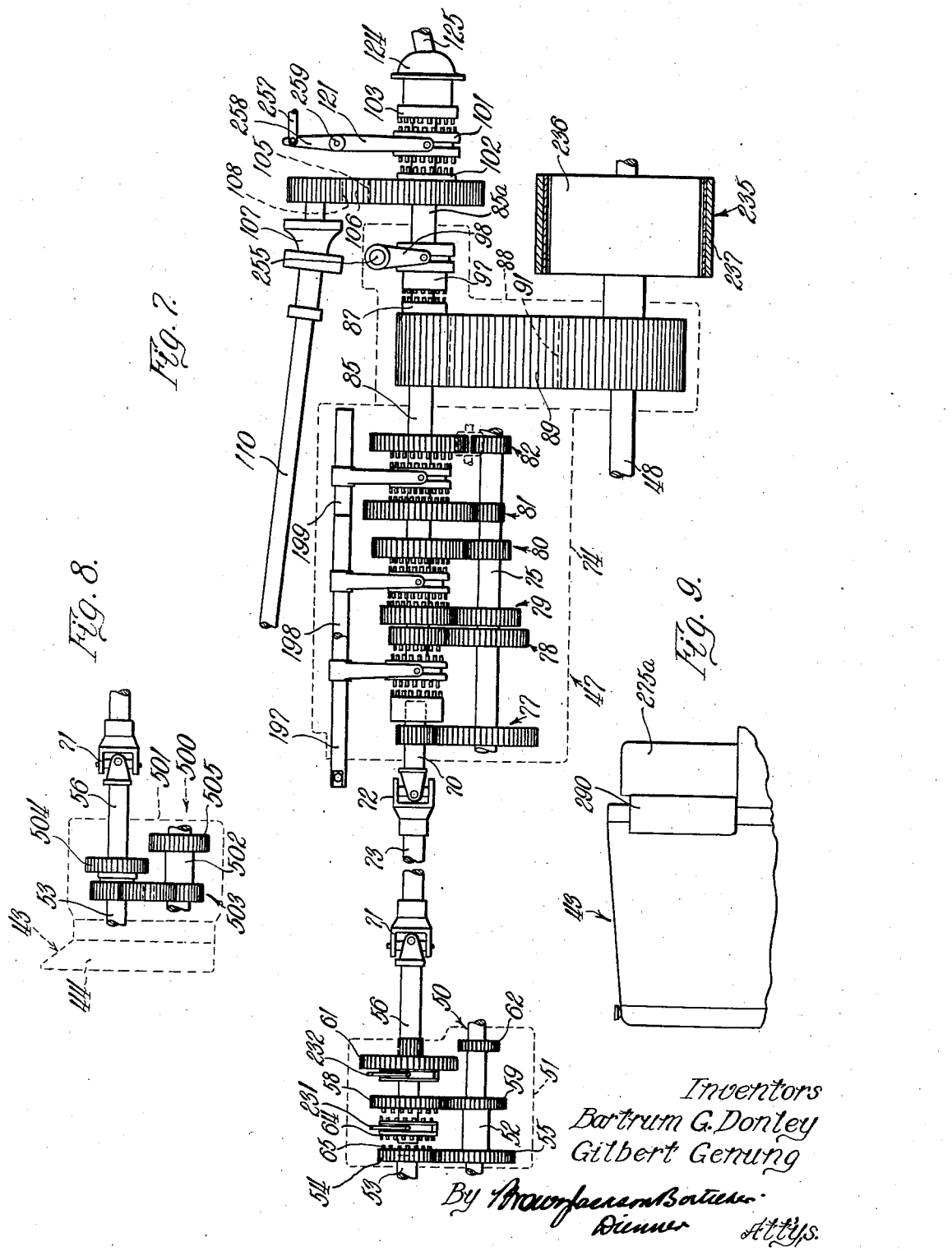

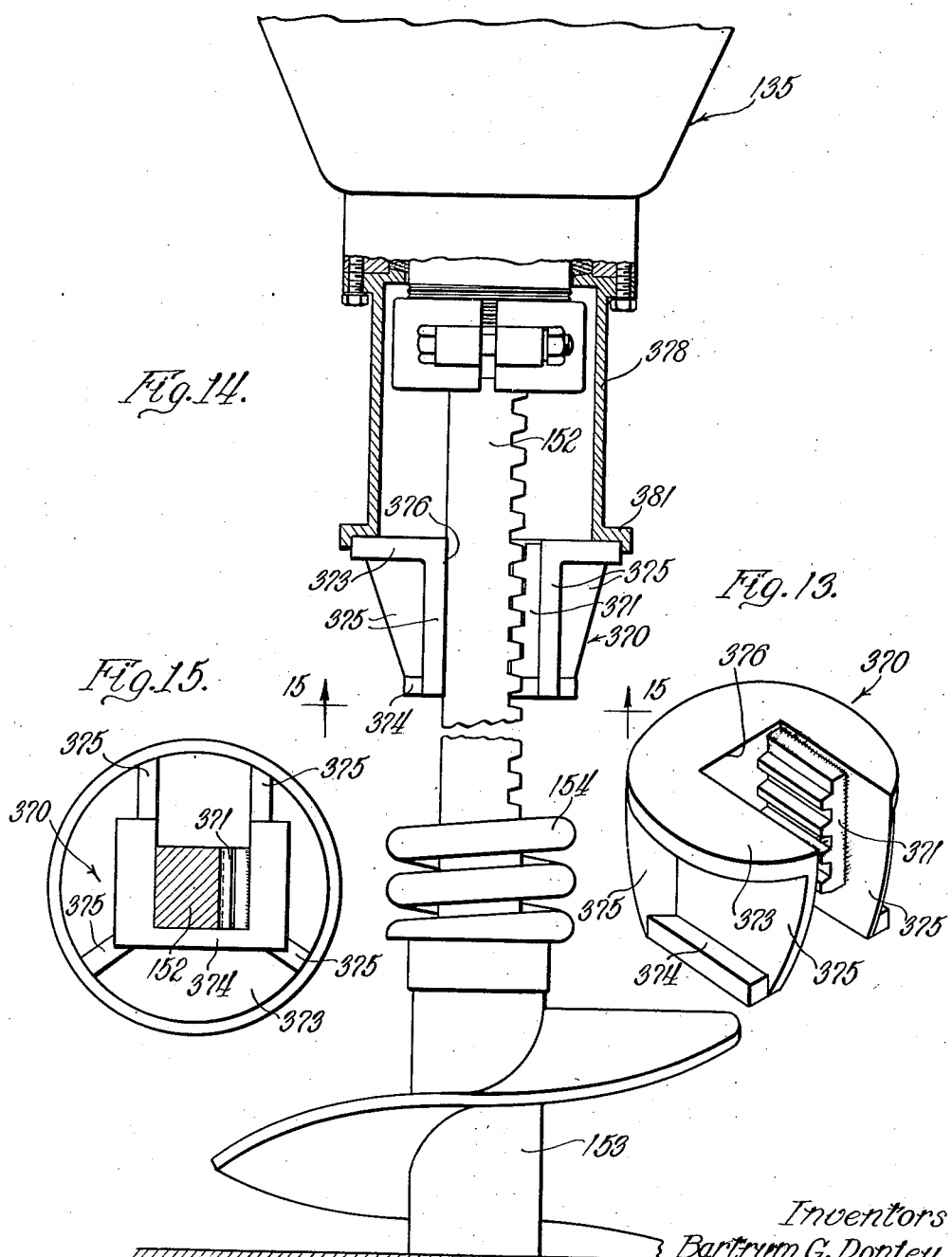

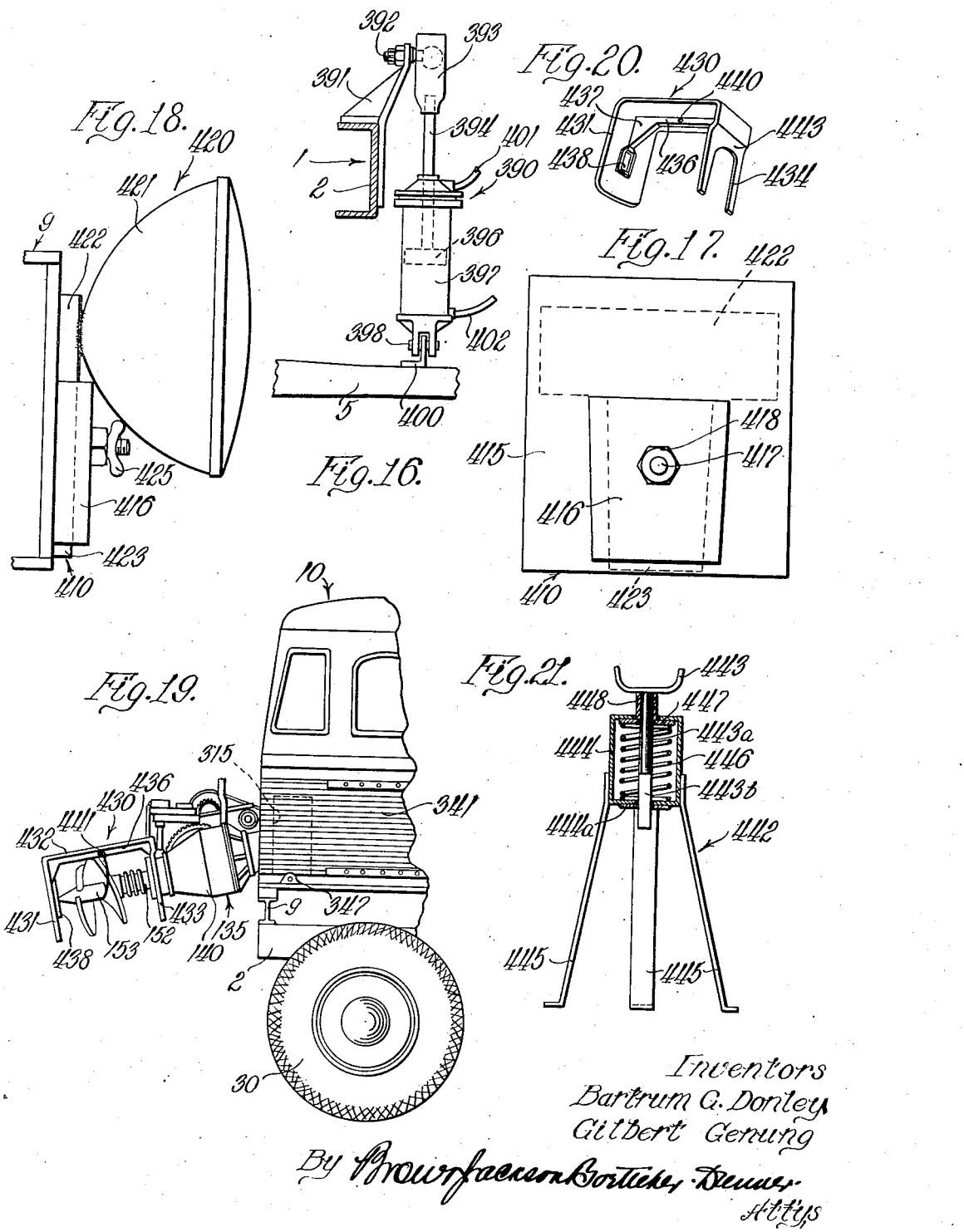

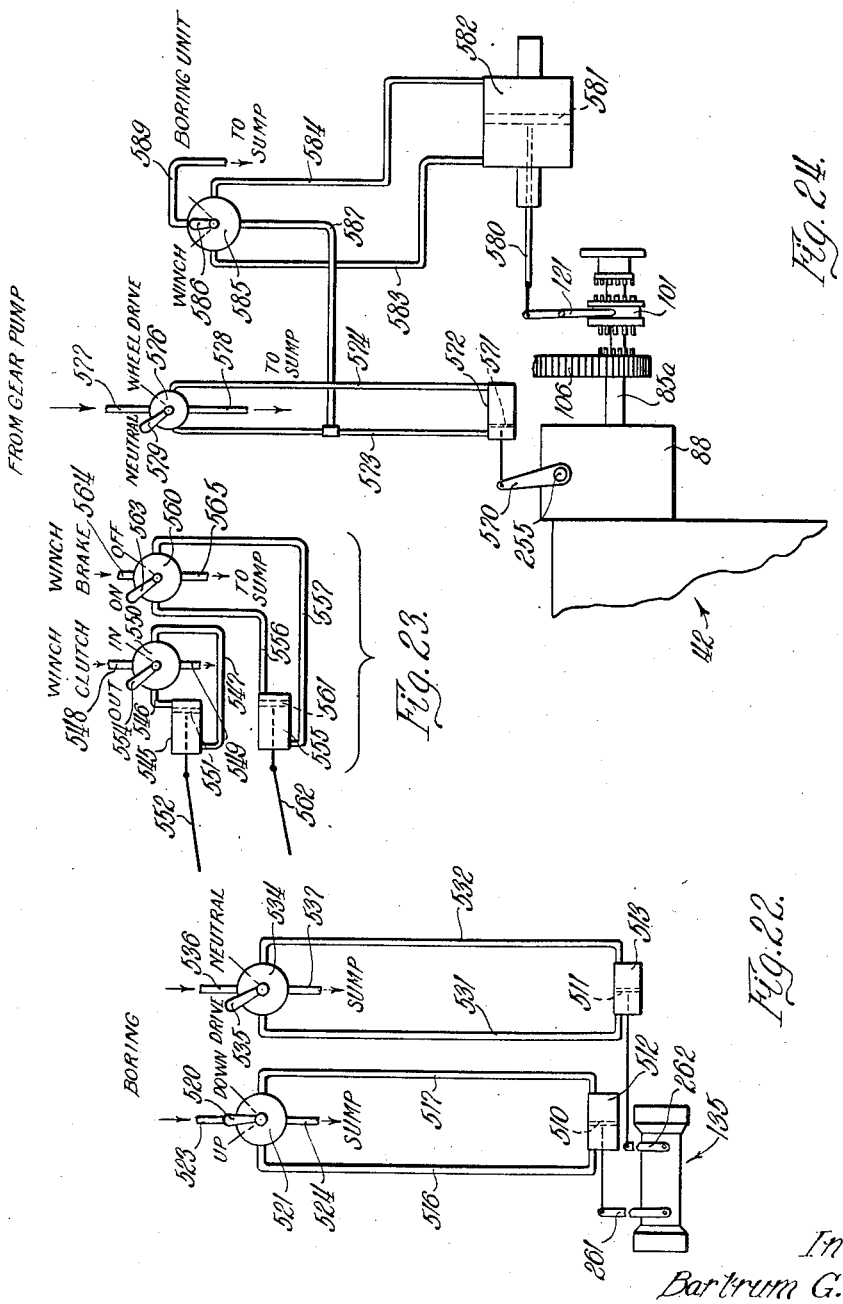

Patented July 29, 1941

2,251,013

UNITED STATES PATENT OFFICE 2,251,013

MACHINE FOR SETTING, SHIFTING, AND REMOVING POLES

Bartrum G. Donley, Clintonville, Wis., and Gilbert Genung, Oak Park, Ill.; said Donley assignor to said Genung Application March 28, 1938, Serial No. 198,404

23 Claims. (Cl. 255—19)

The present invention relates generally to earth boring machines, and more particularly to machines of this type in which a boring unit is mounted on a truck chassis so as to be capable of being driven from place to place as required by the service to which the machine is put.

Machines of this character are usually employed for boring holes in the ground to receive telephone, telegraph, or power line poles, or the like. Holes for such poles are usually in the neighborhood of six to ten feet deep, and the provision of a power machine for boring such holes effects a considerable saving of time and effort as compared with the number of men required and the arduous labor involved in digging such holes by hand.

Attempts have heretofore been made in an effort to provide machines of this character but, in general, such machines were not capable of being handled economically, safely, and conveniently when on location and, in addition, required a crew of several men in order to perform satisfactorily and with acceptable celerity in the field. For example, some of the machines that have heretofore been built have placed the truck driver some distance from the boring unit, with the result that in bringing the machine to the point of operation the driver could not see the point on the ground where the hole was to be bored and had to be directed by a second man on the truck or by a man on the ground. Other machines were so constructed that the motor was between the operator and the boring unit, or adjacent the operator, so that it was difficult for him to hear suggestions or instructions from the ground crew during the time the machine was in operation. Further, some machines were so constructed that when they reached the point where boring operations were to take place, parts of the machine had to be assembled and rigged before actual operations could begin.

The principal object of the present invention is the provision of a machine of this general character but which is so constructed and arranged that the above-mentioned disadvantages are eliminated and production materially increased. More particularly, it is a feature of this invention to provide a machine which preferably is arranged for one-man operation but not necessarily limited thereto. Another feature of our invention is the provision of a machine which can travel at acceptable rates of speed along a highway and, in addition, can leave the highway and traverse soft and irregular ground and can be brought quickly and easily, without backing or similar maneuvering, to the point where the operations are to be performed. Specifically, one important feature of this invention is the provision of a machine of this character having tires large enough to prevent sinking into soft shoulders along the road and which can traverse soft ground or roads without difficulty. Further, in this connection, it is an object of the present invention to provide a machine which can be easily and conveniently maneuvered into the desired position, and to arrange the operator's station on the machine so that he commands a full view of not only the ground over which the machine is to travel, but also the ground into which the boring unit operates. Further, it is an object of this invention to provide a machine of this character in which the operator's station is disposed close to the boring unit, and in which the motor driving the various parts of the machine is disposed at a point removed from both the operator's vision and the position of the boring unit on the chassis, whereby the operator may not only see the ground but, in addition, can readily hear any directions given by the ground crew. A machine of this character is much safer to work about than one in which the operator cannot readily see or hear the men that may be working close to the boring unit or the pole being set.

Another object of this invention is the provision of a power driven earth boring machine in which the operator's cab and the boring unit are mounted over the dirigible wheels of the machine, at the forward end thereof, and in which the power unit driving the various parts of the machine is arranged at the rear. It is also an object of this invention to provide means for adequately cooling the power unit, in the event that it is an internal combustion engine, when arranged in this relation.

Another object of this invention is the provision of a machine that includes a truck chassis carrying a boring unit which is arranged not only to dig holes for power line poles, telegraph poles and the like, but also is adapted to handle the poles, raising them from the ground and dropping them into the hole bored by said unit, and in which the operator's station is so placed that he has practically an unobstructed view of all hole boring and pole handling operations. In this connection, it is a further object of the present invention to mount the boring and pole handling unit so that the latter can be swung back alongside the operator's cab and below the level thereof, so that the machine can be driven along highways and the like without requiring any greater overhead clearance than is provided for normal traffic.

It is also an object of this invention to provide means in the nature of skids to provide for driving the machine over deep, narrow ditches, and to carry such skids on the chassis in such position and so arranged that in removing them from the chassis, handling them when on the ground, and replacing them on the truck chassis when no longer needed, can all be done by the same means that handles the poles.

A further object of this invention is the provision of winch means for raising loads, such as poles and the like, but so associated with the boring unit that the poles are pulled or raised, or other loads handled, without imposing the major portion of such loads upon the truck chassis. Instead, according to our invention, the reaction of the raising means is transmitted through the boring unit directly to the ground.

Still further, another object is the provision of the boring unit mounted at the forward end of the truck chassis and overhanging and disposed forwardly of the dirigible wheels thereof, and in which the motor of the truck is used as a source of power for the boring unit and is disposed rearwardly of the rear wheels, in overhanging relation thereto, so that the motor and boring unit at opposite ends of the chassis frame substantially balance each other, and a further object, particularly in connection with the aforesaid arrangement of the boring unit and motor, is the provision of a short-coupled truck chassis to carry the motor, boring unit, and other parts of the machine so that the machine can be turned in a very limited radius and is otherwise capable of easy manipulation in close or restricted quarters. A still further object is the mounting of the boring unit at the front end of the chassis and at one side thereof and the mounting of the operator's cab at the other side of the front end of the chassis, whereby the boring unit may be folded down into substantially horizontal position at one side of the cab when the machine travels from one location to another. It is also an object of this invention to provide protecting means about the operator's cab so as to prevent damage thereto, or possible injury to the operator, if it should happen that poles or other loads suspended by the load-handling means should inadvertently swing against the cab. Another object of this invention is the provision of a hatch in the cab roof which may be opened to permit the operator to look upwardly from his station while controlling the machine, to observe the position of the upper end of the pole being handled by the machine, and any lines attached thereto.

Another important object is the provision of a machine which can be manipulated in close quarters and with sufficient accuracy to permit the machine being driven off of the highway and with one swing can be moved into a position directly at right angles to a line extending along the highway, and which is equipped with suitable means for raising a pole with lines attached thereto and shifting the pole to a new location without requiring that the lines be deenergized or otherwise put out of service during the removal operation. In this connection, it is the object of this invention to provide a machine which has suitable means for engaging and pulling the pole out of the ground from its old location, transferring the pole to its new location without removing the lines from the pole or in any way disturbing the normal service over the lines, boring a hole in the earth to receive the pole in its new position, and then setting the pole in the newly formed hole.

A further object of this invention is the provision of suitable controlling mechanism for the various operating units of the machine, whereby not only is the machine moved from place to place and steered easily and conveniently at all times, but also the various operating units can all be controlled by one operator from the operator's cab at the front end of the machine. It is a further object, in this connection, to provide for controlling the various units associated with the machine by the main clutch of the power plant. It is also an object to control the power delivered to the various operating units by the main clutch of the truck engine and to control the speed at which such operating units are driven by the accelerator for the truck engine, whereby the control of the machine is facilitated. In this connection it is a further object of our invention to provide power actuated steering and braking controls, either by vacuum or hydraulic pressure, and to provide hydraulic braces between the chassis frame and the axles, so as to render the control of the machine as nearly effortless as possible, whereby one man may easily control all of the operations of the machine without becoming unduly fatigued, and to provide, in addition, remote or power actuated controls for most, if not all, of the operating units.

These and other objects and advantages of the present invention will be apparent to those skilled in the art after a consideration of the following detailed description of the preferred structure, taken in conjunction with the accompanying drawings.

In the drawings:

Figures 5 and 6 are top and side views, respectively, of the operating controls for the several units incorporated in and carried by the machine, these views being partly diagrammatic in character;

Figure 7 is a diagrammatic view, illustrating the power take-off arrangements whereby the boring unit, winch, and wheel drive are taken from the driven shaft of the transmission, this figure also showing diagrammatically a selectively operated extra low gear unit which is utilized when ground or load conditions require low speed and relatively great power;

Figure 8 is a fragmentary view illustrating a reversing transmission which may be used, if desired, in place of, or in addition to, the extra low gear unit;

Figure 9 is a fragmentary view on a reduced scale, showing the disposition of the fuel tank disposed on the machine just forward of the engine at the rear end of the machine;

Figure 10 is a fragmentary view illustrating diagrammatically one form of power steering mechanism with which the machine of the present invention is equipped;

Figure 11 illustrates the manner in which the skids are handled by the winch and boring unit, acting as a hoisting device;

Figure 12 illustrates the position of the skids when they are adapted to receive the front wheels of the machine;

Figure 13 is a perspective view showing the removable yoke which cooperates with the boring unit during the handling of heavy loads to prevent the imposition of such loads upon the chassis of the machine, particularly such stresses as may be encountered when pulling poles;

Figure 14 is a view of the yoke in position on the rack bar of the boring unit;

Figure 15 is a section taken along the line 15—15 of Figure 14;

Figure 16 is a fragmentary view showing one of the hydraulic braces connected between the axles and the chassis frame;

Figure 17 is a front view of one of the head lamp supporting brackets;

Figure 18 is a side view of a head lamp detachably supported in the bracket shown in Figure 17;

Figure 19 is a fragmentary view of the boring unit when folded back alongside the cab when the machine is arranged for travel along a highway or the like;

Figure 20 is a perspective view of the protecting shield which is placed over the boring tool when the boring unit is swung back into transport position, as shown in Figure 19;

Figure 21 is a detail view of the mast or boom support for receiving the latter in its lowered transport position; and Figures 22, 23 and 24 are diagrammatic views showing the application of remote control means for the boring unit, winch clutch and brake, and power take-off drives for the winch and boring unit.

Figure 1:
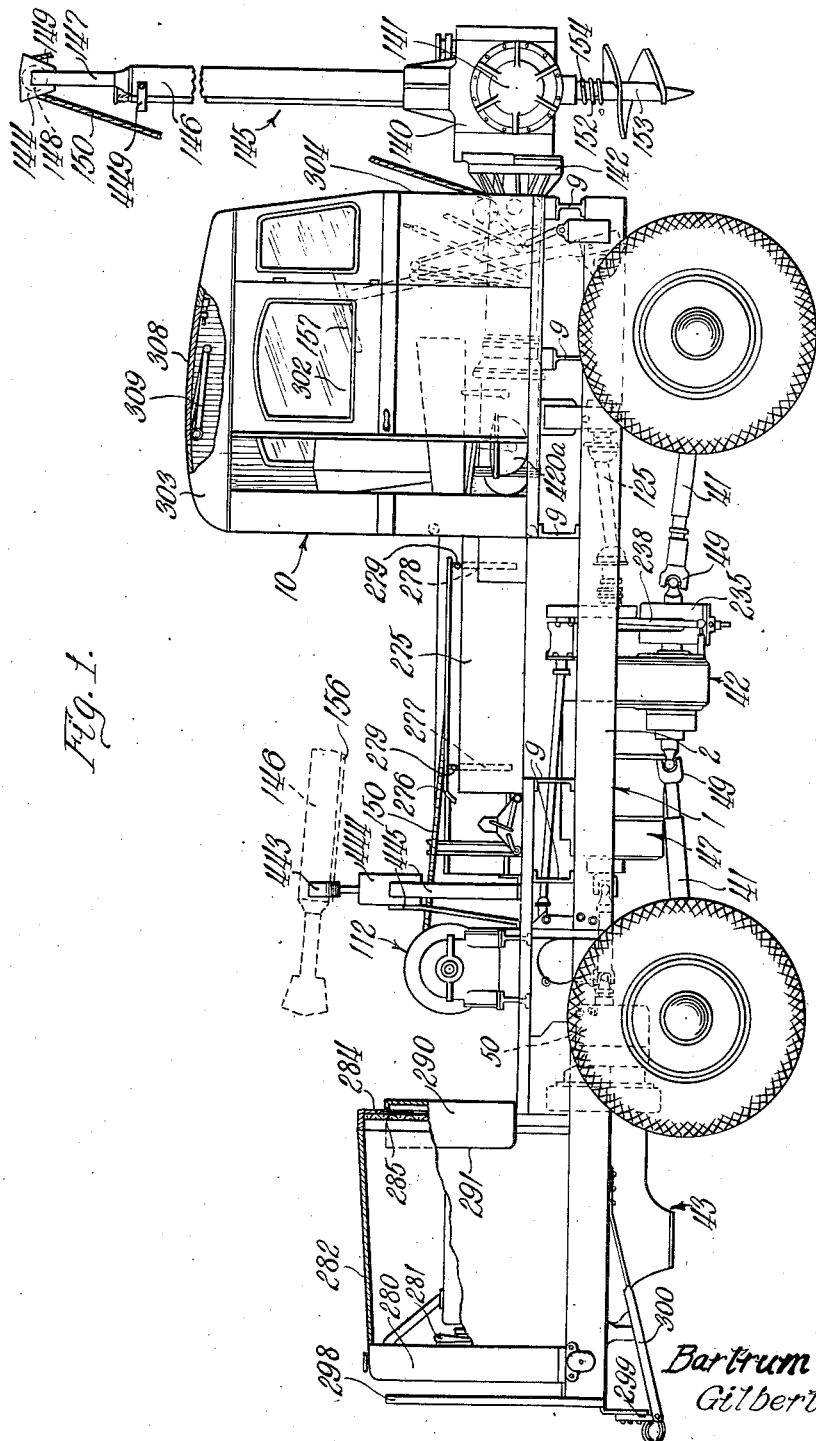
Figure 1 is a side view of a machine constructed according to the principles of the present invention.
Figure 2:
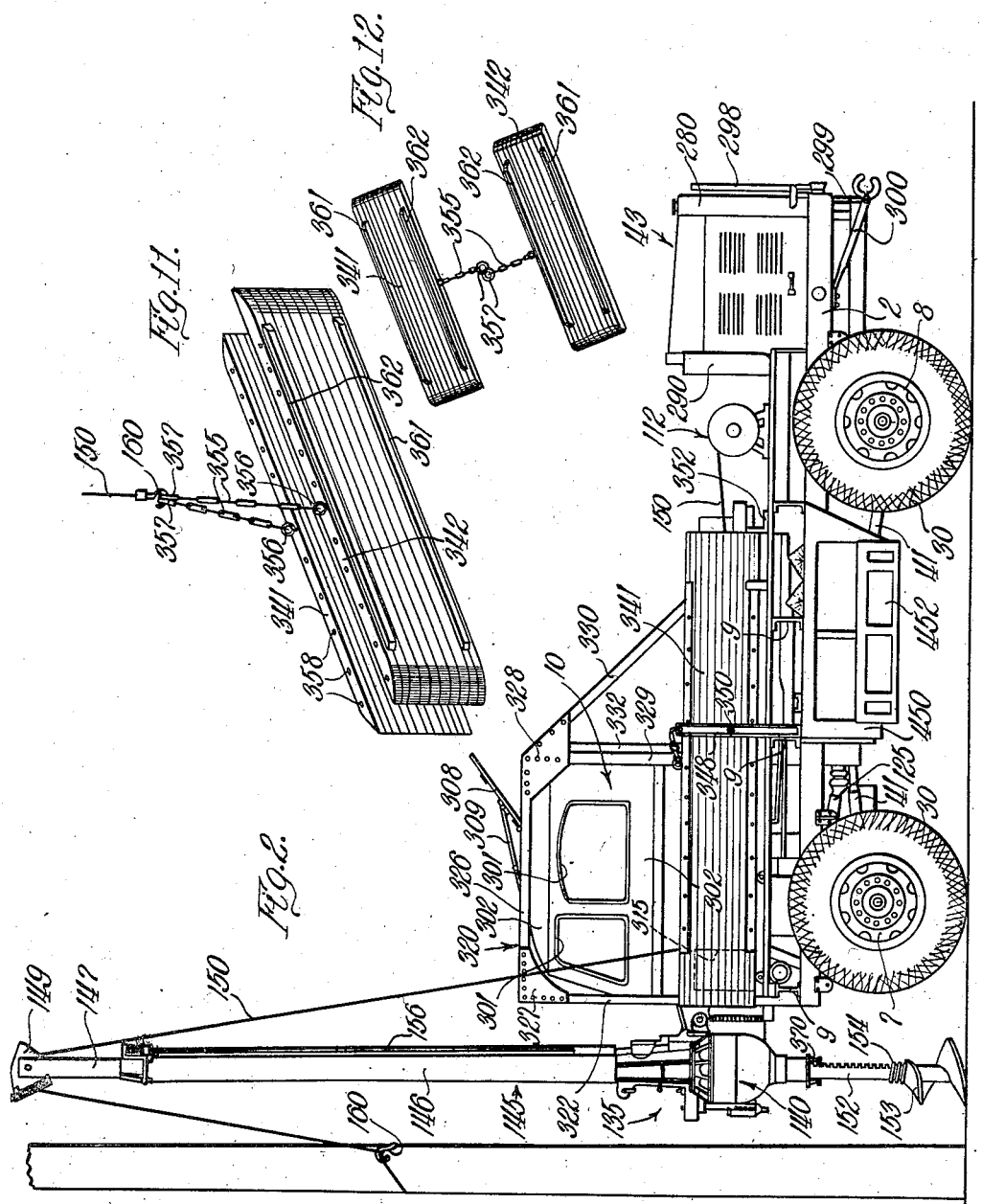
Figure 2 is a view similar to Figure 1, but taken from the other side of the machine, showing the latter when it is arranged for pulling a pole, which may carry telegraph lines, power lines, or the like, out of the ground.
Figure 3:
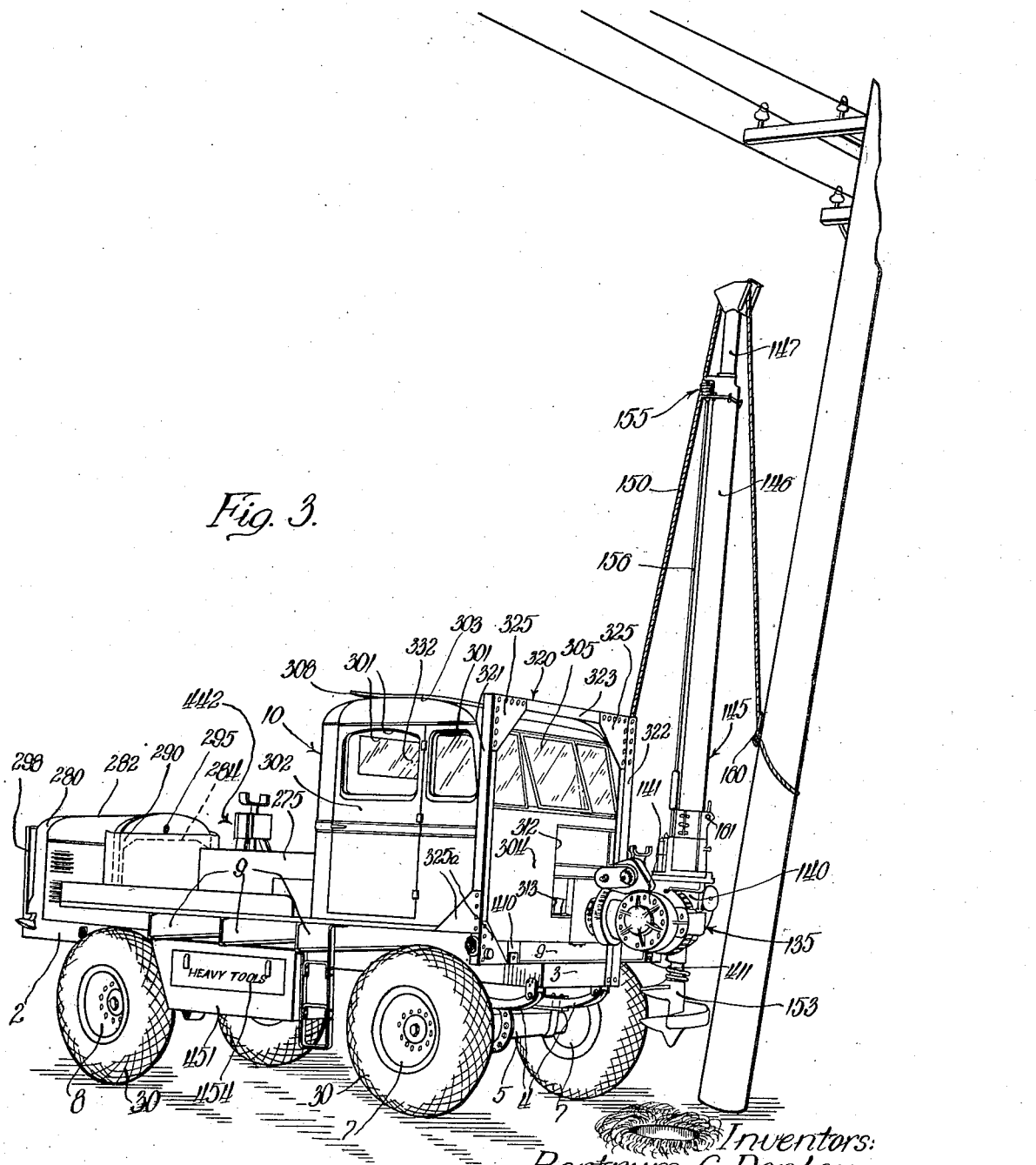
Figure 3 is a view of the machine after it has pulled the pole and transferred it, together with any lines attached thereto, to the new location and has bored the hole to receive the pole.

Referring now more particularly to Figures 1, 2 and 3, the frame of the machine is indicated by the reference numeral 1 and includes suitable longitudinal members 2 and cross bars 3 as required. The frame 1 is carried by suitable springs 4 on front and rear driving axles 5 and 6 which are equipped with front wheels 7 and rear wheels 8. The longitudinal frame members 2 carry cross beams 9 upon which the floor of the machine and the operator's cab 10 are carried. The particular features of the cab will be described later in connection with the controls by which the machine can be driven and operated by one man.

Both front and rear wheel are driving wheels and the front wheels 7 are dirigible, being controlled by a power steering arrangement, such as the one illustrated in Figure 10. Power steering means per se is old, and inasmuch as various forms of power steering are available, it is not necessary to include here a detailed description thereof. The arrangement preferred in carrying out the principles of the present invention is, as best shown in Figure 10, of the type embodying a source of hydraulic pressure controllably directed into a cylinder 12 which is connected through actuating linkage 13 to the steering arms 14 of the dirigible wheels 7. The cylinder 12 includes a piston connected to a piston rod 15 which is pivoted to a fixed bracket 16 attached to some part of the frame 1. The valve mechanism is controlled by an arm 20 to which a steering link 21 is pivoted, the link 21 being actuated by a steering arm 22 controlled by a steering wheel 23 through the usual worm gearing 24 or any other suitable means.

When the steering wheel is turned in one direction to move the arm 20, the movement of the latter relative to the cylinder 12 opens certain valves which admit pressure into the cylinder 12 to move the cylinder in the same direction that the arm 20 is moved by the steering means. Therefore, as long as the steering wheel 23 is actuated to keep the arm 20 in advanced position in one direction relative to the moving cylinder 12, the dirigible wheels 7 of the machine will be steered in that direction, but without requiring that the operator or driver of the machine actually exert the force that steers the wheels. Steering the wheels in the other direction is accomplished by turning the steering wheel 23 to move the arm 20 in the other direction relative to the cylinder 12, whereupon fluid under pressure is admitted into the other end of the cylinder 12 and causes the latter to move in that direction. As long as the steering wheel 23 is turned to keep the arm 20 ahead of the cylinder 12, the latter will continue to move in that direction and shift the wheels 7. Power steering mechanism of this type has the advantage that very heavy machines may be steered easily and quickly without requiring the operator to exert any greater force than to move the arm 20 relative to the cylinder 12. As is obvious, other forms of power steering may be used as desired, and no claim is made to the details per se of the power steering mechanism.

The front and rear axles 5 and 6 are of conventional construction except as they are arranged to accommodate the rear mounting of the power plant, as will be referred to later. As will be apparent from the drawings, the axles are disposed quite close together, taking into consideration the length of the frame 1, and the tires 30 are larger than are conventionally employed for machines of this weight. The purpose of having a short wheel base is to increase the maneuverability of the machine and the purpose of employing oversize tires is to reduce the unit bearing pressure on the soil so that the machine can traverse soft and muddy fields and roads without miring down. This is an important feature, particularly in connection with the four wheel drive feature. The tires 30 are large enough so that the machine, when fully equipped and in operation, has a soil bearing value of between forty and fifty pounds per square inch. This may, of course, vary. Thus, the machine of this invention can traverse almost any ground where a man can walk.

The wheels 7 and 8 are equipped with service brakes 35 (Figure 5) of sufficient capacity to enable the operator to lock the wheels and hold the machine, together with any load suspended or carried thereby, against movement. Preferably, the brakes 35 are actuated by power means, indicated in its entirety by the reference numeral 36, of any desired construction. Usually, power brakes are operated by a vacuum booster arrangement, but it is to be understood that other types of power brakes may be employed as found desirable or necessary. Each of the axles 5 and 6 has a differential and ring gear assembly 40 (Figure 6), and each includes a driving propeller shaft 41, the rear propeller shaft extending forwardly and the forward propeller shaft extending rearwardly to a transmission unit 42 which is driven by a motor 43. The latter includes a clutch housing 44 in which the main clutch is mounted. The clutch is controlled by a clutch shaft 45. The drive unit 42 is driven by a transmission 47 which affords five forward speeds and reverse, and the connections between the unit 42 and the propeller shafts 41 are similar to those conventionally employed in four wheel drive vehicles and hence need not be described in detail. Briefly, the unit 42 contains a driven shaft 48 which, at its opposite ends, is connected by universal joints 49 to the propeller shafts 41.

Figure 5:
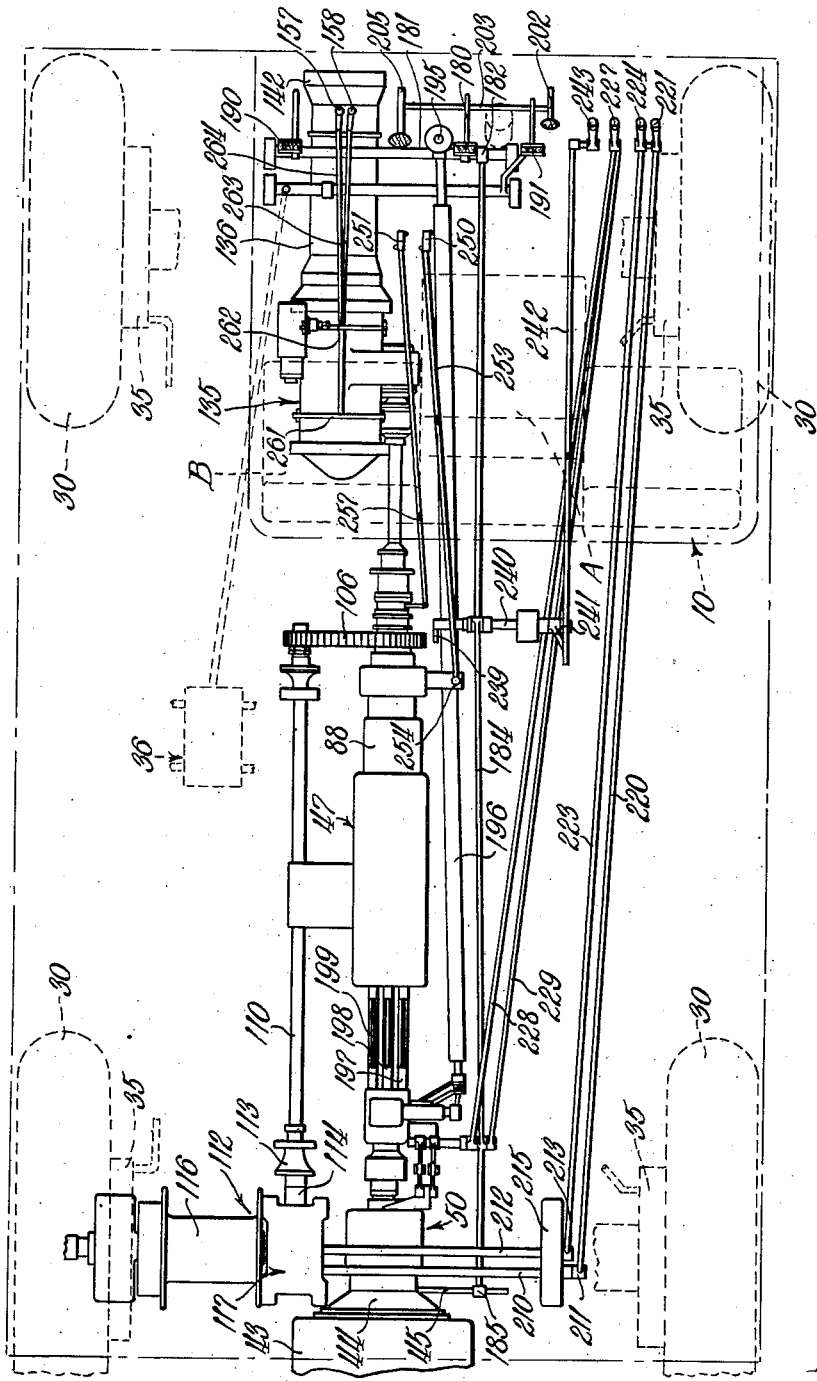

As will be clear from Figures 5 and 6, the motor 43 is arranged at the rear of the frame 2. An auxiliary transmission 50 is disposed between the power plant 43 and the five speed transmission 47. The principal purpose of the auxiliary transmission 50 is to provide two extra low speeds, together with a direct connection which permits the machine to be operated at conventional speeds when extra power is not needed. Referring now to Figure 7, the auxiliary transmission includes a casing 51 in which a countershaft 52 is journaled. The countershaft 52 is driven from the clutch shaft 53 of the engine or power plant 43 by a pair of gears 54 and 55, and the driven shaft 56 may be driven at a reduced rate by two gears 58 and 59, or at an even lower rate by another set of gears 61 and 62. The shafts 53 and 56 can be directly connected together by a clutch member 64 which is moved forwardly to engage a companion clutch 65 at the rear end of the clutch shaft 53. The driven shaft 56 of the auxiliary transmission 50 constitutes the driving means for the main transmission 47, and is connected to the driving shaft 70 of the latter by two universal joints 71 and 72 and a shaft section 73 therebetween, as best shown in Figure 7.

The present invention is not particularly concerned with the details per se of the main transmission 47, but for a clear understanding of the drives and controls provided in the machine embodying the present invention, the main transmission 47 has been shown somewhat diagrammatically in Figure 7. The transmission 47 includes a casing or housing 74 and receives the driving shaft 70 which drives a countershaft 75 by means of a pair of gears 77. Other pairs of gears 78, 79, 80 and 81 afford various reductions, and another set of gears 82 provides for reverse. The driven shaft of the main transmission 47 is indicated at 85 and is extended forwardly, as at 85a. A driving sprocket 87 is journaled for rotation on the shaft 85 within a suitable casing 88 and is connected by a drive chain 89 to a driving sprocket 91 fixed to the shaft 48, whereby the front and rear axles receive power from the power plant through the auxiliary and main transmissions whenever the sprocket 87 is driven.

A clutch member 97 is splined or otherwise connected with the shaft 85 for sliding movement and is controlled by a fork 98. The sprocket 87 and clutch 97 have companion jaw teeth so that when the member 97 is moved rearwardly of the main transmission shaft 85 into engagement with the sprocket 87, the latter will be driven according to the ratio selected in the auxiliary and main transmissions. Another clutch member 101 is in slidable but non-rotatable connection with the forwardly extended portion 85a of the main transmission shaft 85 and has two sets of clutch teeth adapted to engage companion clutch sections 102 and 103. The clutch section 102 is connected with or formed on a driving sprocket 105 which is connected by a driving chain 106 to another sprocket 108. The sprocket 108 is connected by a universal joint 107 to a rearwardly extending winch shaft 110. The shaft 110 drives a winch structure (Figures 1 and 5) through universal joints 113 by which the shaft 110 is connected to a short shaft section 114 forming a part of the winch.

The winch structure just mentioned is indicated in its entirety by the reference numeral 112 and is of more or less conventional construction. According to the principles of the present invention, the winch 112 is mounted on cross beams 115 just forwardly of the power plant 43. The winch 112 includes a clutch for engaging and disengaging the winding drum 116 with the driving unit of the winch indicated in its entirety by the reference numeral 117, and which receives power from the shaft 114. The winch 112 also includes a brake by which the winding drum 116 may be held in any desired position. The clutch and brake of the winch are controlled by separate members, as will be described below, but if desired the winch 112 may have a combined control in which the brake is locked or engaged automatically when the clutch is disengaged, or vice versa. The winch unit 112 has its shaft extended beyond the side of the vehicle so as to receive an auxiliary winding drum 118, which can be used for various purposes. For example, a line can be anchored at one end to the ground, either forwardly or rearwardly of the machine, and then wrapped about the drum 118. The winch is then driven to aid the traction wheels in pulling the machine out of a deep depression.

Referring to Figures 6 and 7, the position of the shiftable clutch member 101 is controlled by a lever 121 so that either the clutch member 102 or the clutch member 103 may be selected to be driven by the shaft 85. The clutch member 103 is connected by a universal joint 124 with a shaft 125 which extends forwardly, and at its forward end has another universal joint 126 by which it drives a shaft 127 journaled in the lower casing section 130 of the boring unit indicated in its entirety by the reference numeral 135. The casing section 130 forms a part of the casing 136 of the boring unit, and suitable connections (not shown) are extended from the shaft 127 into the casing 136 so as to deliver power to the boring unit from the shaft 125. Thus, shifting the lever 121 in one direction connects the boring unit with the transmission shaft 85, and movement of the lever 121 in the other direction connects the winch 112 with the shaft 85. The mechanism for controlling the power take-off clutches, winch clutch, and winch brake, will be described below.

The boring unit 135 may be of any suitable construction. The present invention is not particularly concerned with the details per se of the boring unit except as certain features of the unit are utilized in carrying out the objects of our invention. The boring unit casing 136 is secured rigidly to the frame of the vehicle in any suitable manner and, at its forward end, carries a boring head 140 which is connected to a forward casing section 141 of the boring unit, which is bolted to a flange 142 on the casing 136 at the forward end of the machine. A tower 145 forms a part of the boring head and includes a lower tubular section 146 and an extensible section 147, the latter carrying a pulley 148 at its upper end within a guide or shield 149. A cable 150 is trained over the pulley 148, which cable extends downwardly from the pulley 148 and passes around the pulley 151

(Figure 4) and thence back to the winding drum 116 of the winch unit 112. A rack bar 152 is disposed for vertical and rotational movement within the tower 145, and, at its lower end, carries a boring tool or auger 153 which is fixed rigidly to the rack bar 152 in any suitable manner, but is removable for sharpening or replacement when necessary. A bumper spring 154 surrounds the rack bar 152 and is interposed between the boring head and the auger to cushion the extreme upper movement of the latter.

The mechanism for operating the rack bar is contained within the casings 136 and 141 and within the boring head 140 so that, under the control of the operator, the bar 152 may be rotated and also raised and lowered, as desired. Suitable mechanism is also provided in the boring unit whereby the boring head and auxiliary casing 141 may be swung by power about a longitudinal axis so that a hole may be bored slanting laterally. Similarly, the extension section 147 may be raised or lowered. Also, the boring unit includes suitable mechanism whereby the boring head 140 may be swung about a transverse axis to carry the tower 145 downwardly into a horizontal position, or the tower 145 may be swung forwardly to a certain extent whereby, if desired, the holes may be bored slanting in a generally fore and aft direction. The details of such operating mechanism do not form a part of the present invention, but briefly, the mechanism for swinging the tower 145, either fore and aft or laterally, may be driven through suitable power connections. The extension section 147 of the tower 145 may be raised and lowered by worm and screw means indicated generally at 155, and such means may be actuated by power, as by a long shaft 156 extending downwardly alongside the tower section 146 and into the mechanism of the boring unit. The boring unit 135 is equipped with two levers 157 and 158 by which the vertical movement of the rack bar 152 may be controlled. The cable 150, extending over the tower sheave 148, carries a hook 160 at its outer end which is adapted to be engaged in an eye 161 carried at some convenient place on the boring unit so that the cable hook 160 may be engaged in the eye 161 when the cable is not in use.

The controls for the units described above are all brought into the operator's cab 10 at the forward end of the machine. In the cab, the operator can occupy either of two stations, designated A and B in Figures 4 and 5. Station A is disposed directly rearwardly of the steering wheel 23 of the machine, and normally the operator sits in this position when driving the machine from place to place. The service clutch pedal is indicated at 180 (Figure 5) and is connected to a cross shaft 181 to which an arm 182 is fixed. A link 184 extends rearwardly to an arm 185 on the clutch shaft 45, which controls the main engine clutch in the usual manner as mentioned above. Another pedal 190 is provided at the left hand end of the cross shaft 181 and is disposed in a position to be actuated by the operator when at station B. A brake pedal 191 is disposed to the right of the clutch pedal 180 in a position to be operated conveniently from station A and is connected in any suitable manner to actuate the brake mechanism 36. The gear shift lever is indicated at 195 and is connected to suitable remote actuating mechanism 196 to control the three shift rods 197, 198 and 199 which select the desired ratio in the transmission 47. A throttle or accelerator pedal 202 is connected to a shaft 203. The pedal 202 is disposed in a position to be operated from station A, and at the left portion of the cross shaft 203 another accelerator pedal 205 is disposed convenient to the operator when at station B and at the right of the left clutch pedal. The accelerator cross shaft 203 is connected with the throttle of the power plant 43 in any suitable manner. The clutch of the winch 112 is controlled by a cross shaft 210 to the outer end of which an arm 211 is fixed. The winch brake is controlled by a cross shaft 212, and to the outer end of this shaft an arm 213 is fixed. The outer ends of the cross shafts 210 and 212 may be supported for rocking movement in any suitable manner, such as by a bracket 215 fixed to the frame 1. A link 220 extends forwardly from the winch clutch arm 211 and is connected at its forward end to an actuating lever 221 disposed in the cab 10 adjacent the operator's station A. A link 223 extends forwardly from the brake arm 213, and its forward end is connected to an actuating lever 224 disposed alongside the winch clutch lever 221.

A lever 227 alongside the winch brake lever 224 controls the auxiliary transmission 50 by any suitable means, such as a pair of rods 228 and 229 that extend rearwardly and can be selectively engaged and shifted by the lever 227. The rod 228 is connected with the shift fork 231 (Figure 7) for the direct and intermediate clutch member 64, and the rod 229 is connected to the shift fork 232 for the low ratio gear 61 in the transmission 50.

The machine is equipped with an emergency brake 235 (Figures 6 and 7) mounted on the drive shaft 48 that extends in opposite directions from the casing 88. The brake structure includes a drum 236 fixed to the shaft 48 and a brake band 237 of the external contracting type controlled by a link 238 and an arm 239 (Figures 1 and 6) that is fixed to the inner end of a cross shaft 240. An arm 241 is fixed to the outer end of the latter and is connected by a link 242 to an emergency brake lever 243 disposed alongside the auxiliary gear shift lever 227. A sector 244 (Figure 6) permits the locking of the emergency brake lever 243 in position.

A pair of hand levers 250 and 251 (Figure 5) are disposed adjacent the forward edge of the operator's seat at A and in a position adjacent station B for controlling, respectively, the power take-off for the drive to the wheels and the power take-off for the winch or boring unit, selectively. The lever 250 is connected by a link 253 to an arm 254 on the shaft 255 (Figure 7) to which the fork 98 controlling the clutch member 97 is connected. Thus, the lever 250 may be employed for engaging and disengaging the clutch member 97 with the driving pinion 87, thereby connecting and disconnecting the wheels to and from the driven shaft 85 of the transmission 45. The other lever 251 is connected by a link 257 to an arm 258 that is fixed to the shaft 259 to which the shift fork 121 (Figure 7) is connected. The lever 251 may be moved from a neutral position into either of two positions, selecting either the winch clutch member 102 or the boring unit clutch member 103 for connection to the transmission shaft 85.

The boring unit 135 is controlled by two levers 261 and 262 which, through suitable links 263 and 264, are connected to the clutch levers 157 and 158 of the boring unit. One of the levers controls the upward and downward movements of the rack bar 152, while the other lever controls the rotation of the auger 153.

Figure 4:
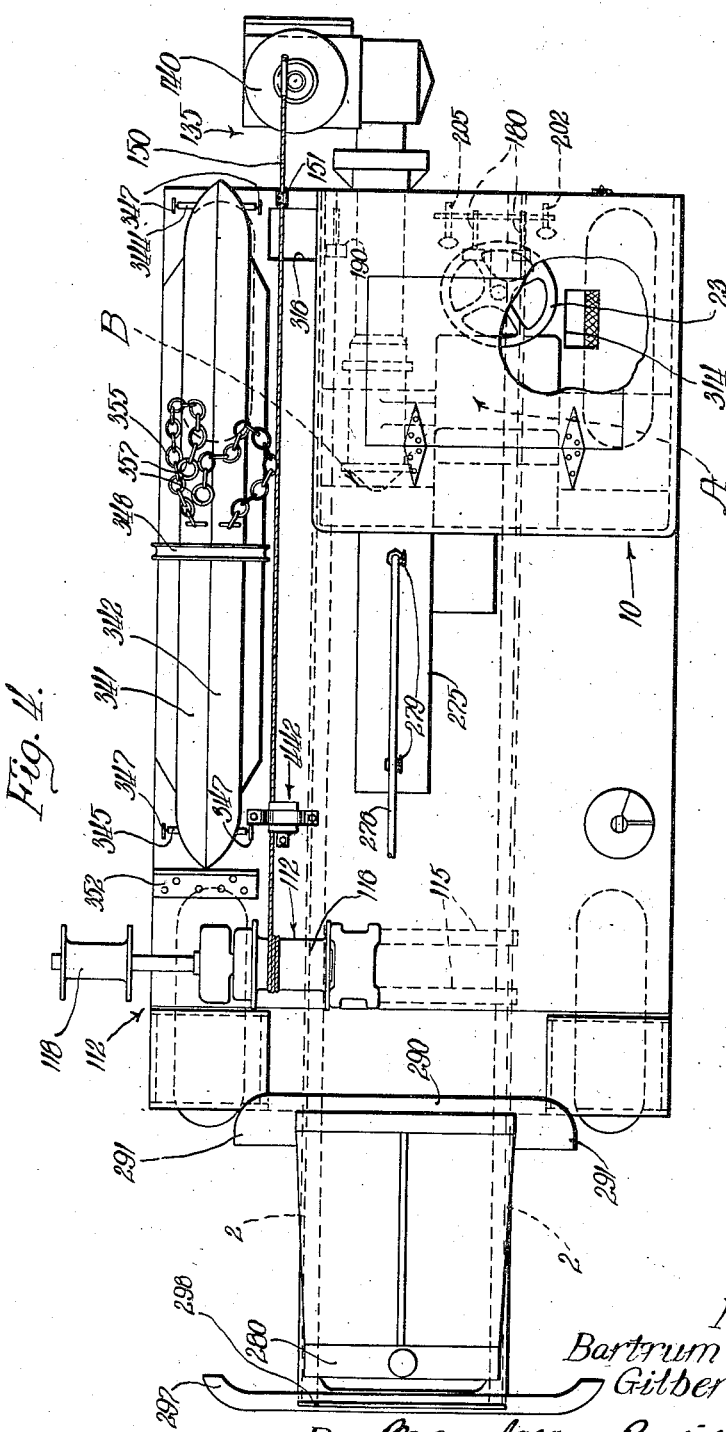
Figure 4 is a plan view of the machine shown in Figures 1 to 3.

Fuel is supplied to the power plant from a tank 275, Figures 1 and 4, which may be disposed in any suitable position on the machine. The fuel line leading to the power plant is indicated at 276 and includes two sections 277 and 278 (Figure 1) leading down into the tank at opposite ends thereof, each section being connected with the line 276 by a manually controlled valve 279. In some cases the machine may be operated at a considerable angle so that all of the fuel in the tank, especially if the fuel supply is low, may be at one end. In that event the section 277 or 278 that is out of contact with the fuel may have its valve closed and the valve for the section reaching the fuel may be opened.

Figure 9 shows a position of the gasoline tank 275a just forward of the power plant, and this arrangement may be adapted where desired. In this event the tank 275a is sufficiently near the power plant so that fuel will be supplied thereto in all operating positions of the machine.

In the preferred construction, the power plant 43 takes the form of an internal combustion engine which is equipped with a cooling radiator 280 (Figure 1) disposed at the rear end of the machine. The internal combustion engine 43 includes a fan 281 which draws air in through the radiator. A hood 282 encloses the motor 43, and at its forward end is disposed over a framework 284 that includes a grille 285. Since the motor 43 is arranged at the rear end of the machine, when traveling forwardly the fan 281 must draw air in from the rear end of the machine and force it forwardly in order to provide for the proper cooling circulation of the air through the radiator. A U-shaped shield 290 is disposed about the grille 285 and has sections 291 directed rearwardly but spaced from the hood 282. Thus, as the machine is driven forwardly, the shield 290 prevents the air pressure from opposing the forward air movement created by the fan 281; instead, the forward movement of the vehicle creates a certain amount of suction at the edges of the shield which aids the fan 281 in drawing air in from the rear end of the machine and forcing it forwardly on the interior of the hood 282 and out the grille 285.

The power plant 43 is equipped with a temperature gauge 295 disposed as indicated in Figure 3 so that the driver in the cab can observe the same in his rear vision mirror. If desired, of course, a suitable temperature indicator may be extended from the motor 43 into the cab on the instrument board of the latter. A bumper 297 (Figure 4) may be carried at the rear end of the machine to protect the radiator 280 from a rear end collision, and the radiator 280 preferably is protected by a grille 298. A draft bar 299 is fastened to the rear of the machine and is reenforced by suitable braces 300.

It will be noted from Figures 1, 2 and 3 that the forward end of the boring unit overhangs the forward end of the frame, while the power plant overhangs the rear end. Disposing the boring tool at the forward end of the machine as closely adjacent the dirigible wheels as is practical has the very important advantage of enabling the operator to position the boring tool at exactly the point on the ground where a hole is desired. It will also be noted that the boring unit is mounted adjacent one side of the machine, while the cab 10 is at the other side of the machine. The cab 10 is specially formed to afford the operator a full view of the top of the pole, the boring auger and the front wheels of the machine.

The operator's cab 10 (Figures 1, 2 and 3) includes cab windows 301, doors 302, a roof 303, a front dash 304, and windshield 305. Preferably, the front portion 304 of the cab is disposed substantially flush with the front end of the frame. The body of the machine as a whole including the cab 10, rests on the cross beams 9.

The roof 303 of the cab 10 is provided with a hatch 308 which may be opened, as indicated in Figure 2, and held in opened position by any suitable means, such as bracing links 309, preferably but not necessarily in the nature of a toggle, so that the hatch may be firmly held either in open or closed position as desired. Thus the machine may be driven along the road without having the hatch rattle. The purpose of the hatch 308 is to permit the operator to observe from either station A or B the position of the upper end of a pole and the lines that may be attached thereto when pulling, removing or setting the pole. The front wall 304 of the cab is provided with two openings 312 and 313 (Figure 3) which permit the operator to see the ground and the lower portions of the pole and boring unit from either position, but especially from position B. An opening 314 (Figure 4) in the floor of the cab permits the operator to view the ground over which the right hand dirigible wheel 7 moves. At this time the operator will be at position A since that is the position from which he usually steers the vehicle. An opening 315 (Figures 2 and 19) in the left wall of the cab and an opening 316 (Figure 4) in the floor enable the operator to see the auger at the left of the machine while boring.

The cab 10 is surrounded, at least on the sides adjacent the boring unit 135, with a protecting framework 320, which is shown in Figures 2 and 3 but is omitted from Figures 1 and 4 for purposes of clarity. The framework 320 consists of a pair of vertical angle irons 321 and 322 and a transverse angle member 323 suitably riveted together, as by gusset plates 325, and connected to the frame of the machine in any suitable manner, as by gusset plates 325a. The framework 320 is extended along the side of the cab 10 adjacent the boring unit and includes a horizontal angle iron 326, extending along the upper edge of the side of the cab and connected by gussets 327 and 328 with the angle 322 and a rear vertical angle 329, and a downwardly and rearwardly extending angle iron 330, also suitably connected to the frame. A rear diagonal angle 332 extends from the gusset 328 downwardly to the frame at the opposite side of the machine. The framework 320 protects the cab from collision with poles, and is made sturdy enough to prevent either the cab or the operator from being damaged or injured in the event that a pole should fall on the cab.

As is best indicated in Figure 4, the operator's cab 10 is disposed adjacent the right hand side of the machine, while the boring unit is disposed generally adjacent the left hand side of the machine. The boring unit may be swung downwardly to substantially horizontal position alongside the left side of the cab, as in Figure 19. In this position, the tower 145 of the boring unit is disposed between the left hand side of the cab 10 and a pair of skids 341 and 342. These skids are carried in suitable supports 344 and 345, preferably in the form of rollers mounted on a shaft and carried in suitable brackets 347. A yoke 348 is fastened to one of the cross beams 9 and surrounds the skids 341 and 342 when they are in position on the machine, as best indicated in Figures 2 and 4, and a pin 350 may be inserted in suitable openings in the yoke 348 and the skids 341 and 342 to lock the latter in their transport position. A bumper angle 352 is disposed just forwardly of the winch 112 to prevent the skids from being pushed too far rearwardly.

Each of the skids 341 and 342 is provided with a chain 355 fastened at its inner end to an eye bolt 356 or the like on the associated skid. A ring 357 is carried at the other end of each chain. The skids are formed of any suitable material, such as planks bolted together in laminated arrangement, as by bolts 358, and each skid is provided with bars 361 and 362 at the edges thereof.

The skids are handled by the cable 150 and the winch 112, and the skids are used to support the front wheels when the hole to be bored or the pole to be pulled or set is disposed closely adjacent a relatively deep ditch. When a condition of this kind is encountered the hook end 160 of the cable 150 is brought around and engaged in the rings 357 and the pin 350 removed from the yoke 348. Then by operating the winch 112 the cable will lift the skids slightly and slide them forwardly of the machine, from which point they can then be swung around by hand and disposed in front of the wheels 7 and over the ditch, in the position shown in Figure 12. Figure 11 shows the manner in which the skids are supported on the cable 150. The skids are placed so as to receive the front wheels 7 of the machine, and in driving upon the skids the operator can look down through the opening 314 in the floor of the cab and see whether the wheels are in the proper position to move onto the skids. The lengths of the chains 355 are such that when the skids are placed in the proper position, they are spaced to conform to the tread width of the machine, as illustrated in Figure 12.

After the hole has been bored, or the pole pulled or set, and it it desired to replace the skids on the machine, the cable 150 is extended to permit the hook 160 to be engaged in the rings 357 (Figure 12). Then by winding up the cable 150 on the winch 112 the chains 355 will raise the skids by lifting upon the edges thereof, thereby breaking any suction if it should happen that the skids have been pressed down into mud or soft soil. When the skids are supported by the cable 150 (Figure 11), it is then a simple matter for one of the ground crew to slide the skids over the rollers 145 and 144 and into position on the machine for transport (Figure 4). Then the pin 350 may be reinserted and the skids locked in position in the yoke 348.

One of the features of this invention is the provision of means relieving the chassis of strains when raising a load, as, for example, when pulling a pole. To this end, the boring tool 153 is utilized as a ground anchor, so that when the winch 112 is operated to draw in the cable 150, which is trained over the upper end of the tower of the boring unit, to raise the load the reaction is transmitted directly to the ground without being imposed upon the springs, axles and wheels of the machine.

Referring now to Figures 13, 14 and 15, a yoke 370 carries a short toothed section 371 preferably welded or otherwise firmly fixed thereto, and is constructed so as to be capable of being engaged with the rack bar 152. The yoke member 370 includes upper and lower flanges 373 and 374 joined together by suitable web sections 375. The yoke 370 is U-shaped and has a recess 376 receiving the rack bar 152, one of the webs 375 carrying the short toothed section 371. The lower end of the boring unit 135 is provided with a short sleeved section 378, and the lower end of the sleeve 378 is flanged as at 381 to receive the upper flange 373 of the yoke 370. When it is desired to raise a load by the cable 150, as pulling a pole, the boring tool 153 is lowered until it is in firm engagement with the ground, and then the yoke 370 is disposed about the rack bar 152 adjacent the lower end of the sleeve 378. Then the cable 150 is connected with the load to be raised and the winch operated to draw in the cable. The boring unit then settles down on the flange 373 of the yoke but cannot move any farther. Since the cable 150 is trained over the upper end of the tower 145, the reaction in raising the load is transmitted directly to the ground through the boring tool 153, rack bar 152 and yoke 370, thus relieving the chassis, springs and wheels of all stresses in connection with raising the load.

In the usual boring operations, the chassis, springs and the like have to sustain the loads incident thereto, including raising the tool and discharging the soil therefrom, and in order to protect the chassis from vibrations and to transmit some of the load directly to the axle during these operations, we mount a hydraulic brace or lock 390, best indicated in Figure 16, between the front axle 5 and chassis at the side adjacent the boring unit 135 and arrange the same to be under the control of the operator. A bracket 391 is fixed to the frame bar 2 adjacent the boring unit. A ball stud 392 is fixed to the bracket 391 and receives a socket 393 carried at the upper end of a piston rod 394. The inner end of the rod 394 carries a piston 396 which is movable vertically with a close fit in a cylinder 397 filled with a suitable liquid. The cylinder 397 is pivoted, as at 398, to a bracket 400 fixed to the front axle 5. Fluid leads 401 and 402 are connected to opposite ends of the cylinder 397 and extend to a control unit 404 (Figure 6) disposed in the operator's cab 10. The unit 404 includes a valve 405 which the operator may open or close. When the valve is open, liquid may flow freely through the conduits 401 and 402, but when the valve is closed the piston 396 becomes hydraulically locked in the cylinder 397, and stresses due to the use of the boring tool are transmitted directly to the axle by the hydraulic lock 390, thus relieving the body and springs. It is understood, of course, that as many hydraulic braces 390 may be provided as desired.

In view of the fact that the boring unit 135 is disposed at the forward end of the machine and in further view of the fact that the pulling and handling of poles also take place at the front end of the machine, it is desirable to remove the head lamps that, in travel, are disposed at the front end of the machine, in accordance with State and City laws and regulations.

In Figure 3, brackets for detachably supporting the head lamps are indicated at 410 and 411. Preferably, the brackets 410 and 411 are welded or otherwise secured to the forward edges of the flanges of the forward cross beam 9. The brackets 410 and 411 are identical, so that the description of one will suffice. Referring now to Figures 17 and 18, a plate 415 is welded to the upper and lower flanges of the cross beam 9, and a socket 416 is secured to the plate 415 in any suitable manner, as by welding or the like. The socket 416 is formed by a generally U-shaped part, the intermediate portion of which is provided with an opening 417, and a nut 418 is secured to the socket 416 in registry with the opening 417. Preferably, the nut 418 is welded to the socket 416, but if desired, the nut 418 may be omitted and the opening in the socket 416 threaded. The head lamp detachably associated with the bracket 410 is indicated at 420 and includes a head lamp casing 421 to the rear of which a flat bracket 422 is secured, as by welding or the like. The bracket 422 includes a tapered section 423 which extends downwardly of the lamp from the portion of the plate 422 that is welded to the lamp. The threaded member 418 receives a winged screw 425.

The head lamp may be placed in position at the front of the machine when the latter is to be arranged for travel by loosening the wing screw 425 and inserting the tapered section 423 of the head lamp bracket in the socket 416, in the position indicated in dotted lines in Figure 17. Then the wing screw 425 may be tightened, which clamps the lamp firmly in position. When the machine is to be used in pulling, setting and shifting poles, the lamps 420 are removed from their brackets and placed in some suitable position on the machine out of the way. For example, the lamps may be fastened to suitable brackets underneath the operator's seat, as indicated at 420a in Figure 1.

When the boring unit 135 is swung backwardly into horizontal position (Figure 19), as for travel along a highway, with the tower 145 disposed in position between the skids and the left hand side of the cab, the tool 153 projects forwardly, and in the event of an accidental collision with an object, the tool might inflict considerable damage or injury. In order to prevent this, the auger guard, shown in Figure 19, has been provided. The auger guard is indicated in its entirety by the reference numeral 430 and includes a forward plate section 431, an intermediate connecting section 432, and a rear section 433 having a slot 434 therein adapted to embrace the sleeve 378 (Figure 14) just back of the flange 381. A reenforcing web 436 is welded to the intermediate section 432 and has extended end sections 437 that are welded to the guard sections 431 and 433. A socket 438 is carried on the plate 431 and receives the point of the auger, as best shown in Figure 19. An opening 440 is formed in the web 436 and forms a means by which the guard may be fixed in place, as at 441 (Figure 19). Any kind of latch or lock may be used for attaching the guard 430 to the auger to hold it in position during travel.

When the mast or boom is swung downwardly into substantially horizontal position, the outer end is supported by a supporting bracket indicated in its entirety in Figures 1, 4 and 21 by the reference numeral 442, which includes a saddle 443 secured to a shank 443a having a flattened section 443b. The saddle and its shank are movably supported in a casing 444 that is supported by legs 445 fastened in any suitable manner to the floor of the machine. The casing 444 includes a spring 446 which is confined therein between the bottom of the casing and a plate 447 through which the shank 443a extends. A collar or sleeve 448 is disposed about the shank 443a above the disc 447. The bottom of the casing 444 includes a plate 444a welded thereto and having an opening corresponding to the shape of the lower end 443b of the saddle shank so as to prevent the saddle from turning in the casing 444. The boom or mast 145 carries a strap 449 bolted thereto in a position to rest in the saddle 443 when the mast 145 is lowered into its travel position. The principal purpose of the strap 449 is to protect the shaft 156 which controls the mast extension.

When lowering the mast, the appropriate gears in the boring unit are engaged and the mast lowered by power. When the strap 449 first engages the saddle 443 the operator should immediately disengage the drive for the lowering operation. However, if the drive is not immediately disengaged, the spring 446 yields and prevents damage to the mast gearing.

Tool compartments 450 and 451 are provided at the sides of the machine as shown in Figures 2 and 3, respectively. The compartment 450 has a door 452, shown in open position in Figure 2, and the other compartment 451 has a door 454. The compartment 450 is disposed on the same side of the machine as the boring unit, and the other compartment 451 is disposed on the other side. In order to aid in balancing the machine, all heavy tools and the like are placed in the compartment 451, while the compartment 450 is adapted to receive only light tools and similar equipment.

The space between the power plant at the rear of the machine and the cab at the forward end is sufficient to carry all accessory equipment that may be needed in the operation, such as spare augers, cables, and timbers, as well as jacks, chains, supplies of drinking water, additional fuel and lubricant containers for the machine, and the like.

The grille 298 at the rear end of the machine and the radiator 280 are painted or formed so as to mask the functional character of the units at the rear end of the machine. The reason for this is that as the machine is traveling along the highway it may be overtaken by faster passenger cars, and if the radiator and grille resembled the conventional radiator structure of an ordinary truck, the driver overtaking the machine may become confused and think that the truck is approaching him on the wrong side of the highway. Masking or disguising the appearance of the radiator on the rear end construction of our machine effectively prevents this confusion.

In some installations it may be desirable to provide a reversing unit, instead of the auxiliary transmission unit 50 described above, and in that event the unit shown in Figure 8 may be substituted for the auxiliary transmission 50. The unit shown in Figure 8 consists of a conventional reversing transmission which may or may not be provided with an extra low gear reduction. As illustrated in Figure 8, the reversing unit is indicated in its entirety by the reference numeral 500 and includes a casing 501 secured to the clutch housing 44. The driven shaft 53 of the power plant 43 drives a countershaft 502 in the opposite direction, through a train of reversing gears indicated at 503. The shaft 56 has a gear 504 slidably mounted thereon which may be moved rearwardly into mesh with a gear 505 on the countershaft 502, or the gear 504 may be moved forwardly so as to connect directly the shafts 53 and 56, the unit 500 thus affording either reverse or a direct drive. The shiftable gear 504 is controlled in any suitable manner by a shift lever disposed in the operator's cab 10.

The controls described above and shown more particularly in Figures 5, 6 and 7, are in the nature of mechanical controls actuated directly by the driver of the machine. It has been found that under certain conditions the constant shifting of the clutches, levers and other operating parts may become quite tiresome, especially where the machinery controlled by the various operating parts is relatively heavy and requires considerable exertion on the part of the driver, as, for example, the boring unit. One feature of this invention is the provision of power-actuated remote control means for the boring unit, the winch clutch and brake, and the clutches controlling the wheel drive and the winch and boring unit drives, which permits the operator to control the various parts but which does not require the operator to exert a great amount of force. Any form of commercially available remotely actuated control means may be employed, such as vacuum operated means, means operated by air or liquid under pressure, or electricity, or any combination of them, as desired, but to best illustrate the principles of our invention we have shown in Figures 22, 23 and 24 power-actuated means of the hydraulic type, which may utilize oil or other liquid under pressure and may for example, derive its power from the same source as the power steering unit referred to above. Figures 22, 23 and 24 are more or less diagrammatic since the present invention is not concerned with the details of the remote control mechanism.

Referring first to Figure 22, the levers 261 and 262 of the boring unit are connected, respectively, to pistons 510 and 511 movably disposed in cylinders 512 and 513. Suitable conduits 516 and 517 lead from opposite ends of the cylinder 510 to a control unit that includes valve 520 movably disposed in a valve casing 521 into which the conduits 516 and 517 are connected, together with a pressure line 523 coming from an oil pump or other source of pressure and a connection 524 which leads to a sump or other point of discharge. Other conduits 531 and 532 extend from the cylinder 513 to a second control unit including a housing 534 in which a valve 535 is mounted. A pressure line 536 and a discharge line 537 are similarly connected to the valve housing 534.

The first valve unit is so constructed that turning the valve 520, say to the left as viewed in Figure 22, arranges the connections so that the piston 510 is shifted to move the lever 261 of the boring unit into a position to elevate the rack bar carrying the boring tool. Moving the valve 520 in the other position arranges the connections so that the boring unit lever 261 is shifted in the other direction to lower the boring bar, and moving the lever 520 into an intermediate position serves to retain the boring bar in fixed position. The boring lever 562 is arranged to control suitable means connecting the drive to rotate the boring tool bar, and the connections in the valve housing 534 of the other valve unit are so arranged that moving the valve 535 into one position causes the piston 511 to be moved to shift the lever 262 of the boring unit into a position establishing the drive for the boring tool. Moving the valve 535 into its other position moves the piston 511 into a position disconnecting the drive for the boring unit.

The levers 520 and 535 thus represent the actuating means for any form of remote control mechanism which may be employed for controlling the boring unit levers 261 and 262.

Figure 23 illustrates a pair of units for controlling the winch clutch and brake. In general, such units are similar to those described above. A cylinder 545 is connected by lines 546 and 547 to a valve unit 550 to which pressure and discharge lines 548 and 549 connect. The valve unit 550 includes a piston 551 which is connected by linkage 552 to the winch clutch. The valve unit also includes a valve 554, and turning the latter into one position or the other controls the piston 551 and, through the linkage 552, engages or disengages the winch clutch. The winch brake is controlled in the same way, the cylinder 555 having connections 556 and 557 to a valve unit 560. Within the cylinder 555 is a piston 561 which is connected by linkage 562 to the winch brake. Turning the valve 563 of the valve unit 560 from one position to another applies or releases the winch brake. Pressure and discharge lines 564 and 565 are connected to the valve unit 560.

The clutch for engaging and disengaging the wheel drive is controlled by the arm 98 that is mounted on the shaft 255, as shown in Figure 7 and described above. Figure 24 shows one form of remote control means that may be employed for engaging and disengaging the wheel drive clutch. An arm 570 is fixed to the shaft 255 and is connected to a piston 571 that is disposed in a cylinder 572. A pair of conduits 573 and 574 lead from opposite ends of the cylinder 571 to a valve housing 576 into which pressure and discharge lines 577 and 578 lead. A valve 579 is disposed in the casing 576 and may be turned into one position to disengage the wheel drive and in the other position to engage the wheel drive.

The clutch 101 for optionally engaging and disengaging the winch and boring unit drives may be controlled by similar remote control means. The arm 121 is link-connected to a piston rod 580 which, in turn, is connected to a piston 581 that is disposed in a cylinder 582. Opposite ends of the cylinder 582 are connected by conduits 583 and 584 to a valve housing 585 in which a valve 586 is disposed. The pressure line 587 for the valve housing 585 is connected to the conduit 573 of the wheel drive control mechanism so that it will not be possible to engage either the boring unit or the winch drive unless the wheel drive is in neutral position. If desired, of course, the conduit 587 may connect directly to a source of pressure. The valve housing 585 includes a discharge connection 589. Turning the valve 586 in one position engages the winch drive and in its other position engages the boring unit drive, and in a neutral position the valve 586 disengages both drives. The several pressure connections 523, 536, 548, 564, 577, and 587 may all be connected to the same source of pressure, and similarly the discharge connections 524, 537, 549, 565, 578, and 589 may all lead to the the same sump if desired.

While we have shown and described above the preferred structure in which the principles of this invention have been embodied, it is to be understood that our invention is not to be limited to the specific details shown and described above, but that, in fact, widely different means may be employed in the practice of the broader aspects of our invention.

What we claim, therefore, and desire to secure by Letters Patent is:

1. In a machine of the character described, an automotive vehicle comprising a substantially rectangular frame having a front axle and a rear axle each provided with ground wheels adjacent the sides of said frame, the latter extending forward and rearward beyond the respective axles and said front wheels being dirigible, a boring unit at one front corner of said frame extending forwardly thereof, a power plant on said frame in back of said rear axle, an operator's protective cab on said frame at the front thereof extending in part forward beyond said front axle and having openings giving unobstructed observation of one of said dirigible wheels and said unit and the ground area beneath and adjacent the latter, and control means within said cab readily accessible to an operator facing forward therein for maneuvering said vehicle and said unit and controlling operation thereof from said power plant.

2. In a machine of the character described, an automotive vehicle comprising a substantially rectangular frame having a front axle and a rear axle each provided with ground wheels adjacent the sides of said frame, the latter extending forward and rearward beyond the respective axles and said front wheels being dirigible, a boring unit at one front corner of said frame extending forwardly thereof and located between said front wheels, a power plant on said frame in back of said rear axle, an operator's protective cab on said frame at the front thereof extending in part forward beyond said front axle and having openings giving unobstructed observation of one of said dirigible wheels and said unit and the ground area beneath and adjacent the latter, and control means within said cab readily accessible to an operator facing forward therein for maneuvering said vehicle and said unit and controlling operation thereof from said power plant.

3. In a machine of the character described, an automotive vehicle comprising a substantially rectangular frame having a front axle and a rear axle connected to said frame by supporting springs and each provided with ground wheels adjacent the sides of said frame, the latter extending forward and rearward beyond the respective axles and said front wheels being dirigible, a boring and lifting unit at one front corner of said frame extending forwardly thereof and located between said front wheels, a power plant on said frame in back of said rear axle, locking means effective when operative for transmitting load directly from said frame to said front axle while permitting when inoperative springing of said frame, an operator's protective cab on said frame at the front thereof extending in part forward beyond said front axle and having openings giving unobstructed observation of one of said dirigible wheels and said unit and the ground area beneath and adjacent the latter, and control means within said cab readily accessible to an operator facing forward therein for maneuvering said vehicle and said unit and controlling operation thereof from said power plant and for optionally rendering said locking means operative and inoperative.

4. In a machine of the character stated, an automotive vehicle comprising a substantially rectangular frame having a front axle and a rear axle each provided with ground wheels adjacent the sides of said frame, the latter extending forward and rearward beyond the respective axles providing a substantial overhang at the front and the rear of said frame with the space between the overhang and the ground substantially unobstructed, all of said wheels being driven and said front wheels being dirigible, a boring unit at one front corner of said frame extending forwardly thereof, a power plant on said rear overhang, an operator's protective cab on said front overhang having openings giving unobstructed observation of one of said dirigible wheels and said unit and the ground area beneath and adjacent the latter, and control means within said cab readily accessible to an operator facing forward therein for maneuvering said vehicle and said unit and controlling operation thereof from said power plant.

5. In a machine of the character described, an automotive vehicle comprising a substantially rectangular frame having a front axle and a rear axle connected to said frame by supporting springs and each provided with ground wheels adjacent the sides of said frame, the latter extending forward and rearward beyond the respective axles and said front wheels being dirigible, a boring and lifting unit at one front corner of said frame extending forwardly thereof and located between said front wheels, said unit comprising a boring tool and a lifting mast, a power plant on said frame at the back thereof, an operator's protective cab on said frame at the front thereof extending in part forward beyond said front axle and having openings giving unobstructed observation of one of said dirigible wheels and said unit and the ground area beneath and adjacent the latter, said cab being spaced from one side of said frame and said unit being positionable to dispose said mast lengthwise of said frame at said one side thereof and alongside said cab, and control means within said cab readily accessible to an operator facing forward therein for maneuvering said vehicle and said unit and controlling operation thereof from said power plant.

6. In a machine of the character described, an automotive vehicle comprising a substantially rectangular frame having a front axle and a rear axle connected to said frame by supporting springs and each provided with ground wheels adjacent the sides of said frame, the latter extending forward and rearward beyond the respective axles and said front wheels being dirigible, a boring and lifting unit at one front corner of said frame extending forwardly thereof and located between said front wheels, said unit comprising a boring tool and a lifting mast, a power plant on said frame at the back thereof, an operator's protective cab on said frame at the front thereof extending in part forward beyond said front axle and having openings giving unobstructed observation of one said dirigible wheels and said unit and the ground area beneath and adjacent the latter, said cab being spaced from one side of said frame and said unit being arranged with said mast and tool disposed to one side of said cab in substantial alignment with the portion of said frame at said one side thereof, said unit being positionable to dispose said mast substantially horizontally lengthwise of said frame at said one side thereof and alongside said cab, and control means within said cab readily accessible to an operator facing forward therein for maneuvering said vehicle and said unit and controlling operation thereof from said power plant.

7. In a machine of the character described, an automotive vehicle comprising a substantially rectangular frame having a front axle and a rear axle connected to said frame by supporting springs and each provided with ground wheels adjacent the sides of said frame, the latter extending forward and rearward beyond the respective axles and said front wheels being dirigible, a boring and lifting unit at one front corner of said frame extending forwardly thereof and located between said front wheels, said unit comprising a boring tool and a lifting mast, a power plant on said frame at the back thereof, an operator's protective cab on said frame at the front thereof extending in part forward beyond said front axle and having openings giving unobstructed observation of one of said dirigible wheels and said unit and the ground area beneath and adjacent the latter, said cab being spaced from one side of said frame and said unit being positionable to dispose said mast lengthwise of said frame at said one side thereof and alongside said cab, a winding drum mounted on said frame transversely and at said one side thereof in substantial alignment with said mast and adjacent and optionally driven from said power plant, and control means within said cab readily accessible to an operator facing forward therein for maneuvering said vehicle and said unit and controlling operation thereof and of said drum from said power plant.

8. In a machine of the character described, an automotive vehicle comprising a substantially rectangular frame having a front axle and a rear axle connected to said frame by supporting springs and each provided with ground wheels adjacent the sides of said frame, the latter extending forward and rearward beyond the respective axles and said front wheels being dirigible, a boring and lifting unit at one front corner of said frame extending forwardly thereof and located between said front wheels, said unit comprising a boring tool and a lifting mast, a power plant on said frame at the back thereof, an operator's protective cab on said frame at the front thereof extending in part forward beyond said front axle and having openings giving unobstructed observation of one of said dirigible wheels and said unit and the ground area beneath and adjacent the latter, said cab being spaced from one side of said frame and said unit being positionable to dispose said mast lengthwise of said frame at said one side thereof and alongside said cab, two winding drums mounted on said frame transversely and at said one side thereof adjacent and optionally driven from said power plant, one of said drums being substantially aligned with said mast and the other drum extending outwardly beyond said one side of said frame, and control means within said cab readily accessible to an operator facing forward therein for maneuvering said vehicle and said unit and controlling operation thereof and of said drums from said power plant.

9. In a machine of the character described, an automotive vehicle comprising a substantially rectangular frame having a front axle and a rear axle each provided with ground wheels adjacent the sides of said frame, said front wheels being dirigible, a boring unit at one front corner of said frame extending forwardly thereof, a power plant on said frame, an operator's protective cab on said frame at the front thereof disposed in front of said power plant extending in part forward beyond said front axle and having openings giving unobstructed observation of one of said dirigible wheels and said unit and the ground area beneath and adjacent thereto, and control means within said cab readily accessible to an operator facing forward therein for maneuvering said vehicle and said unit and controlling operation thereof from said power plant.

10. In a machine of the character described, an automotive vehicle comprising a substantially rectangular frame having a front axle and a rear axle connected to said frame by supporting springs and each provided with driven ground wheels adjacent the sides of said frame, said front wheels being dirigible, a boring and lifting unit at one front corner of said frame extending forwardly thereof, a power plant on said frame, locking means permanently connecting said frame to said front axle effective when operative for transmitting load directly from said frame to said front axle while permitting when inoperative springing of said frame, an operator's protective cab on said frame at the front thereof disposed in front of said power plant extending in part forward beyond said front axle and having openings giving unobstructed observation of one of said dirigible wheels and said unit and the ground beneath and adjacent thereto, and control means within said cab readily accessible to an operator facing forward therein for maneuvering said vehicle and said unit and controlling operation thereof from said power plant and for optionally rendering said locking means operative and inoperative.

11. In a machine of the character described, an automotive vehicle comprising a substantially rectangular frame having a front axle and a rear axle each provided with driven ground wheels adjacent the sides of said frame, said front wheels being dirigible, a boring unit at one front corner of said frame extending forwardly thereof, a power plant on said frame, an operator's protective cab on said frame at the front thereof disposed in front of said power plant and having openings giving unobstructed observation of one of said dirigible wheels and said unit and the ground area beneath and adjacent thereto, said cab having a transparent windshield in its front wall and control means within said cab readily accessible to an operator facing forward therein for maneuvering said vehicle and said unit and controlling operation thereof from said power plant.

12. In a machine of the character described, an automotive vehicle comprising a wheel mounted substantially rectangular frame having driven dirigible front wheels, a unit comprising a boring tool and a lifting mast at the front and adjacent one side of said frame extending forwardly thereof, a power plant on said frame, an operator's protective cab at the front of said frame spaced from said one side thereof disposed in front of said power plant and having openings giving unobstructed observation of one said dirigible wheels and said unit and the ground area beneath and adjacent the latter, said unit being positionable with said mast disposed lengthwise of said frame at said one side thereof and alongside said cab, and control means within said cab readily accessible to an operator facing forward therein for maneuvering said vehicle and said unit and controlling operation thereof from said power plant, said cab having a transparent windshield permitting the operator to view the road when driving the vehicle forward.

13. In a machine of the character described, an automotive vehicle comprising a substantially rectangular frame, a unit comprising a boring tool and a lifting mast at the front and adjacent one side of said frame extending forward thereof, a power plant on said frame at the back thereof, an operator's protective cab at the front of said frame spaced from said one side thereof and having openings giving unobstructed observation of said unit and the ground area beneath and adjacent the latter, said unit being positionable with said mast disposed lengthwise of said frame at said one side thereof and alongside said cab, and control means within said cab readily accessible to an operator facing forward therein for maneuvering said vehicle and said unit and controlling operation thereof from said power plant.

14. In a machine of the character described, an automotive vehicle comprising a substantially rectangular frame, a unit comprising a boring tool and a lifting mast at the front and adjacent one side of said frame extending forward thereof, a power plant on said frame, an operator's station in front of said power plant spaced from said one side of said frame and giving unobstructed observation of said unit and the ground area beneath and adjacent the latter, said unit being positionable with said mast disposed lengthwise of said frame at said one side thereof and alongside said station, control means at said station readily accessible to an operator facing forward there for maneuvering said vehicle and unit and controlling operation thereof from said power plant, and a protective cab enclosing said station having a transparent windshield permitting the operator to view the road ahead of him when driving the vehicle forward.

15. In a machine of the character described, an automotive vehicle comprising a substantially rectangular frame, a boring unit at the left front corner of said frame extending forward thereof, a power plant on said frame, an operator's station in front of said power plant and at the right front corner of the frame giving unobstructed observation of said unit and the ground area beneath and adjacent the latter, and control means at said station readily accessible to an operator facing forward there for maneuvering said vehicle and unit and controlling operation thereof from said power plant.

16. In a machine of the character described, an automotive vehicle comprising a substantially rectangular frame and a floor thereon, front and rear axles beneath said frame, supporting springs between said axles and frame, ground wheels on said rear axle, dirigible ground wheels on said front axle, a transmission and clutch unit at the central portion of said frame beneath said floor, a power plant on said frame at the back thereof extending above said floor, a drive shaft from said engine to said transmission and clutch unit, a unit comprising a boring tool and a lifting mast at the front of said frame, a drive shaft under said frame from said transmission and clutch unit to said rear axle, a drive shaft under said frame from said transmission and clutch unit to said front axle, a drive shaft extending from said transmission and clutch unit forward to said boring tool and lifting mast unit, a cab with an operator's seat disposed at the front of said frame for supporting the operator in position to observe the operation of the boring tool and lifting mast unit, and controls disposed in said cab accessible to the operator on said seat for selectively controlling the driving of said wheels and said boring tool and lifting mast unit.

17. In a machine of the character described, an automotive vehicle comprising a substantially rectangular frame and a floor thereon, front and rear axles beneath said frame, supporting springs between said axles and frame, ground wheels on said rear axle, dirigible ground wheels on said front axle, a transmission and clutch unit at the central portion of said frame beneath said floor, a power plant on said frame at the back thereof extending above said floor, a drive shaft from said engine to said transmission and clutch unit, a unit comprising a boring tool and a lifting mast at one front corner of said frame, drive shafts under said frame extending rearward and forward from said transmission and clutch unit to said rear and front axles, respectively, a drive shaft extending from said transmission and clutch unit forward to said boring tool and lifting mast unit, a cab at the front of said frame spaced from said corner thereof and provided with an operator's seat disposed for supporting an operator in position to observe the operation of the boring tool and lifting mast unit, the latter being positionable with said mast disposed lengthwise of said frame alongside said cab, and controls disposed in said cab accessible to the operator on said seat for selectively controlling the driving of said wheels and said boring tool and lifting mast unit.

18. In a machine of the character described, an automobile vehicle comprising a substantially rectangular frame and a floor thereon, front and rear axles beneath said frame, supporting springs between said axles and frame, ground wheels on said rear axle, dirigible ground wheels on said front axle, a transmission and clutch unit at the central portion of said frame beneath said floor, a power plant on said frame at the back thereof extending above said floor, a drive shaft from said engine to said transmission and clutch unit, a unit comprising a boring tool and a lifting mast at one front corner of said frame, drive shafts under said frame extending rearward and forward from said transmission and clutch unit to said rear and front axles, respectively, a drive shaft extending from said transmission and clutch unit forward to said boring tool and lifting mast unit, a cab at the front of said frame spaced from said corner thereof and provided with an operator's seat disposed for supporting an operator in position to observe the operation of the boring tool and lifting mast unit, the latter being positionable with said mast disposed lengthwise of said frame alongside said cab, a winch on said frame in back of said cab in line with said mast and provided with a hoisting cable for cooperation with said mast, a drive shaft from said transmission and clutch unit to said winch, and controls disposed in said cab accessible to the operator on said seat for selectively controlling the driving of said wheels and said boring tool and mast unit and said winch.

19. In a machine of the character described, an automotive vehicle comprising a substantially rectangular frame, front and rear axles beneath said frame, supporting springs between said axles and frame, ground wheels on said rear axle, dirigible ground wheels on said front axle, a transmission and clutch unit beneath said frame at the central portion thereof, a power plant on said frame at the back thereof extending thereabove, a unit comprising a boring tool and a lifting mast at the front and adjacent one side of said frame, driving connections between said power plant and said transmission and clutch unit, driving connections between the latter unit and said axles and said boring tool and lifting mast unit, respectively, an operator's protective cab at the front of said frame spaced from said one side thereof and having openings giving unobstructed observation of said boring tool and lifting mast unit and the ground area beneath and adjacent the latter, said boring tool and lifting mast unit being positionable with said mast disposed lengthwise of said frame at said one side thereof and alongside said cab, and control means within said cab accessible to an operator therein for maneuvering said vehicle and said boring tool and lifting mast unit and controlling operation thereof from said transmission and clutch unit.

20. In a machine of the character described, an automotive vehicle comprising a substantially rectangular frame, front and rear axles beneath said frame, supporting springs between said axles and frame, ground wheels on said rear axle, dirigible ground wheels on said front axle, a transmission and clutch unit beneath said frame at the central portion thereof, a power plant on said frame at the back thereof extending thereabove, a unit comprising a boring tool and a lifting mast at the front and adjacent one side of said frame, driving connections between said power plant and said transmission and clutch unit, driving connections between the latter unit and said axles and said boring tool and lifting mast unit, respectively, an operator's protective cab at the front of said frame spaced from said one side thereof and having openings giving unobstructed observation of said boring tool and lifting mast unit and the ground area beneath and adjacent the latter, said boring tool and lifting mast unit being positionable with said mast disposed lengthwise of said frame at said one side thereof and alongside said cab, a winch on said frame at said one side thereof in back of said cab and in line with said mast, driving connections between said winch and said transmission and clutch unit, and control means within said cab accessible to an operator therein for maneuvering said vehicle and said boring tool and lifting mast unit and controlling operation thereof and of said winch from said transmission and clutch unit.

21. An automotive boring machine and derrick, comprising a four wheel drive chassis having a chassis frame, a pair of axles and four driven road wheels, the two front wheels being dirigible, a driving engine carried on the chassis frame, a combination earth auger and hoisting mast unit mounted in front and at one side of the frame, a winch on the frame, and an operator's cab at the front and other side of the frame for providing protection to the operator against injury from a pole which is being operated upon by the mast, said cab having openings permitting the operator to see the ground under and around the auger, said cab containing control apparatus for controlling the driving of the wheels, control apparatus for controlling the steering of the front wheels, control apparatus for controlling the driving of the auger, and control apparatus for controlling the operation of the winch, said mast being capable of being swung back over the chassis frame in approximately horizontal position whereby it is both lowered and gotten out of the line of vision of the operator.

22. A machine of the character described, comprising a chassis frame with a transverse driving axle adjacent each end, road wheels on said axles, the front wheels being dirigible, a protective cab for the operator at the extreme front end and right side of the frame, a driving engine with a selective speed and direction transmission at the extreme rear end of the frame, a central transmission below the frame and intermediate the axles, a driving connection from the first transmission to the second transmission, drives from said second transmission to both axles to drive all four wheels, a combined earth auger and hoisting mast unit mounted at the front left hand side of the frame and angularly movable on two axes, said auger and mast being foldable back over the frame at the left hand side of the cab, a drive from said second transmission to said unit, control means for selectively controlling the drive through said two transmissions to drive the wheels and the auger respectively, and a steering wheel for steering the front wheels, said latter control means and steering wheel being disposed within the operator's cab.

23. In combination, a chassis frame with cross axles, four driven wheels, the front two being steering wheels, an engine at the rear of the frame, a forward facing cab at the front right hand corner of the frame, an earth auger and hoisting mast unit mounted on the frame at the left hand side and in front of the frame, said mast and auger unit being foldable from vertical position back over the chassis frame alongside the left hand side of the cab into approximately horizontal position, a central power distribution transmission on the frame, a driving connection from the engine to the transmission, and driving connections from the distribution transmission to the four wheels and to the auger for driving the wheels and the auger, control means for driving the wheels and the auger, control means in the cab for controlling said transmission, and steering means in said cab for steering the front wheels.

BARTRUM G. DONLEY.
GILBERT GENUNG.

CERTIFICATE OF CORRECTION.

Patent No. 2,251,013.  July 29, 1941.

BARTRUM G. DONLEY, ET AL.

It is hereby certified that error appears in the printed specification of the above numbered patent requiring correction as follows: Page 13, second column, lines 52 and 53, claim 23, strike out the words and comma, "control means for driving the wheels and the auger,"; and that the said Letters Patent should be read with this correction therein that the same may conform to the record of the case in the Patent Office.

Signed and sealed this 23rd day of September, A. D. 1941.

(Seal)

Henry Van Arsdale,
Acting Commissioner of Patents.